(12) United States Patent
Ichinose et al.

(10) Patent No.: US 7,795,753 B2
(45) Date of Patent: Sep. 14, 2010

(54) FUEL CELL CONTROL SYSTEM

(75) Inventors: Masaya Ichinose, Hitachiota (JP); Kenji Takeda, Hitachi (JP); Motoo Futami, Hitachiota (JP); Masahiro Komachiya, Hitachinaka (JP); Kenji Kubo, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 10/729,967

(22) Filed: Dec. 9, 2003

(65) Prior Publication Data
US 2004/0115487 A1 Jun. 17, 2004

(30) Foreign Application Priority Data
Dec. 10, 2002 (JP) .............................. 2002-357920

(51) Int. Cl.
H02J 5/00 (2006.01)
H02J 3/00 (2006.01)
H02J 1/00 (2006.01)

(52) U.S. Cl. ....................................................... 307/45
(58) Field of Classification Search .................. 307/45
See application file for complete search history.

(56) References Cited
U.S. PATENT DOCUMENTS
2002/0131285 A1* 9/2002 Kawakami ................. 363/132

2003/0159865 A1* 8/2003 Schmidt ..................... 180/65.3
2004/0095023 A1* 5/2004 Jacobson et al. ............... 307/80

FOREIGN PATENT DOCUMENTS

| JP | 07-073895 | | 3/1995 |
| JP | 2002-034162 | | 1/2002 |
| JP | 2002-063927 A | * | 2/2002 |
| JP | 2002-075424 | | 3/2002 |
| JP | 2002-152976 | | 5/2002 |

OTHER PUBLICATIONS
Japanese Office Action dated Feb. 6, 2007. (English translation).
* cited by examiner Primary Examiner—Fritz M Fleming
Assistant Examiner—Dru M Parries
(74) Attorney, Agent, or Firm—Antonelli, Terry, Stout & Kraus, LLP.

(57) ABSTRACT

To control the receiving power, this invention uses a secondary battery to cut peaks of the receiving power. Further, this invention calculates the load power from the detected receiving power value and command values of the secondary battery in the controller and the power generating facility, and filters the load power to create command values of the fuel cells.

4 Claims, 6 Drawing Sheets

FUEL CELL CONTROL SYSTEM

BACKGROUND OF THE INVENTION

This invention relates to a fuel cell control system for efficient operations of a fuel cell system.

A fuel cell system disclosed in Japanese Laid-open Patent Publication No. 2002-63927 contains a means which increases a fuel to the fuel cell according to the increase of a circuit current between the fuel cell and a load and causes the secondary battery to charge to reduce the delay when an electric load increases.

More peculiarly, this document discloses a method of controlling a fuel cell system by providing an auxiliary machine such as a gas pump, liquid pump, or control valve to actuate the fuel cell, supplying commercial power to the auxiliary machine or electric power from a fuel cell system to said auxiliary machine to supply hydrogen gas to the fuel cell, cool the fuel cell or control apparatus when a commercial power supply fails. With this, electric power to said auxiliary machine is supplied from a secondary battery connected to the fuel cell when a commercial power supply fails.

SUMMARY OF THE INVENTION

An object of this invention is to provide an operation control system for a fuel cell that can detect electric power coming from an electric power system.

An object of this invention is to provide an operation control system for a fuel cell that can calculate a load power from the received electric power.

When the fuel cell system directly uses a load power and the load changes precipitously, the fuel supply to the fuel cell changes frequently. This reduces the efficiency of power generation of the fuel cell.

This invention improved operations of the system by causing the output of the fuel cell to follow the load, controlling the secondary battery to suppress the incoming electric power under a preset value, and using the fuel cell and the secondary battery efficiently.

This invention has a configuration below.

A fuel cell control system comprising a first converter electrically connected to an electric power system through a circuit-breaker means, a set of fuel cells connected to the DC circuit of said converter through a second converter, a secondary battery connected to said DC circuit through a third converter, a current detecting means which detects AC currents from said converters and outputs their detected values, a voltage detecting means which detects an AC voltage on the power system side of said circuit breaker means and outputs its detected value, a fuel cell current detecting means which detects a current from said fuel cell set, a fuel cell voltage detecting means which detects the voltage of said fuel cell set, a secondary battery current detecting means which detects a current from said secondary battery, and a secondary battery voltage detecting means which detects the voltage of said secondary battery; wherein said electric power system is equipped with a receiving current detector which detects the total of a current flowing through said first converter and a current flowing through an electric load connected in parallel with said first converter.

A fuel cell control system comprising a first converter electrically connected to an electric power system through a circuit-breaker means, a set of fuel cells connected to the DC circuit of said converter through a second converter, a secondary battery connected to said DC circuit through a third converter, a current detecting means which detects AC currents from said converters and outputs their detected values, a voltage detecting means which detects an AC voltage on the power system side of said circuit breaker means and outputs its detected value, a fuel cell current detecting means which detects a current from said fuel cell set, a fuel cell voltage detecting means which detects the voltage of said fuel cell set, a secondary battery current detecting means which detects a current from said secondary battery, and a secondary battery voltage detecting means which detects the voltage of said secondary battery.

The fuel cell control system further comprising a voltage regulating means which feeds back a DC voltage value detected by said first converter and outputs a current command value so that the product of the fed-back DC voltage value by the current command value may be equal to the power command value, an automatic current regulator which feeds back said detected DC voltage value and outputs an output voltage command value to make the current equal to said current command value, a pulse output means which receives said output voltage command value and outputs pulses to drive the converter, and a control unit which controls charging and discharging of the power system and power according to said voltage command value.

The fuel cell control system further comprising a means to control said second converter has a current control means to make the current command value to the current of the fuel cell and a means to control said third converter has a current control means to make the current command value to the current of the secondary battery.

The fuel cell control system further comprising a receiving current detector which detects the total of a current flowing through said first converter and a current flowing through an electric load connected in parallel with said first converter, a first power calculating means which calculates a receiving power from a receiving current detected by said receiving current detector and a system voltage detected by said system voltage detecting means, a second power calculating means which calculates a power from said first converter, and a means which calculates a power consumed by said load from the outputs of said first and second power calculating means.

DETAILED DESCRIPTION OF THE PREFERRED EMBODIMENTS

Embodiments of the present invention will be described below with reference to the accompanying drawings.

Figure 1:
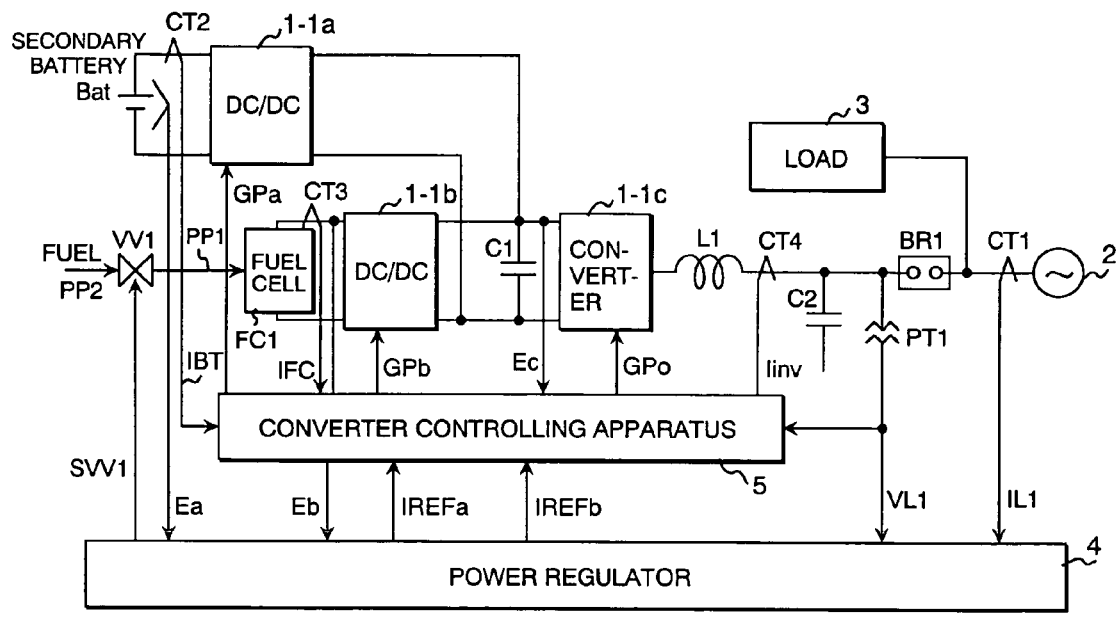
FIG. 1 is a functional block diagram of a power converter which is one embodiment of this invention.

FIG. 1 shows an embodiment to accomplish a power converter of this invention. FIG. 1 shows a single line diagram of a voltage type power converter which can convert a DC power to a single-phase AC power or a single-phase AC power to a DC power. Referring to FIG. 1, a secondary battery Bat is connected to a DC/DC converter 1-1a which converts a DC voltage level. This DC/DC converter 1-1a is connected to a capacitor C1 (on the DC side) of the converter 1-1c which converts a DC power to an AC power. The AC output of said converter 1-1c is connected to a reactor L1 which constitutes an AC filter for removing harmonic components.

The reactor L1 is connected to a circuit breaker BR1 and a capacitor C2 which constitutes the AC filter. The circuit breaker BR1 is connected to the power system 2. A load 3 is connected between the circuit breaker BR1 and the power system 2. The capacitor C1 on the DC side of the converter 1-1c is connected to the fuel cell through the DC/DC converter 1-1b. The fuel cell FC1 is connected to a pipe PP1. The pipe PP1 is connected to a fuel regulating valve VV1. The valve VV1 is connected to the pipe PP2 to regulate a flow rate of a fuel flow through the pipe PP1. The fuel cell FC1 takes in air and hydrogen-rich fuel which is reformed, for example, from a utility gas, chemically reacts the fuel gases into a DC electric power, and feeds the electric power to said DC/DC converter 1-1b.

The power regulator 4 (power control apparatus) receives a receiving current value IL1 detected by the current detector CT1 which is provided near the power system 2 between the power system 2 and the load 3, a voltage value VL1 detected by a voltage detecting means PT1 for detecting a voltage of the power system 2, and a second battery voltage value Ea detected by a secondary battery voltage detecting means. The power regulator 4 outputs a signal SVV1 indicating the opening of the fuel regulating valve VV1 to the fuel regulating valve VV1 and further outputs current command values IREFa and IREFb of said DC/DC converters 1-1a and 1-1b to the converter controlling apparatus 5.

The converter controlling apparatus 5 receives a current value Iinv detected by the current detector CT4 for detecting a current flowing through the reactor L1, a voltage value VL1 detected by the voltage detector PT1, a voltage value Ec of the capacitor C1 provided on the DC side of the converter, a current value IBT detected by the current detecting means CT2 for detecting a current output from the secondary battery Bat, a current value IFC detected by the current detector CT3 of the fuel cell Bat, and current command values IREFa and IREFb of said DC/DC converters 1-1a and 1-1b. The converter controlling apparatus 5 outputs a gate signal GP0 for driving the converter 1-1c, a gate signal GPa for driving the DC/DC converter 1-1a, and a gate signal GPb for driving the DC/DC converter 1-1b.

Figure 2:
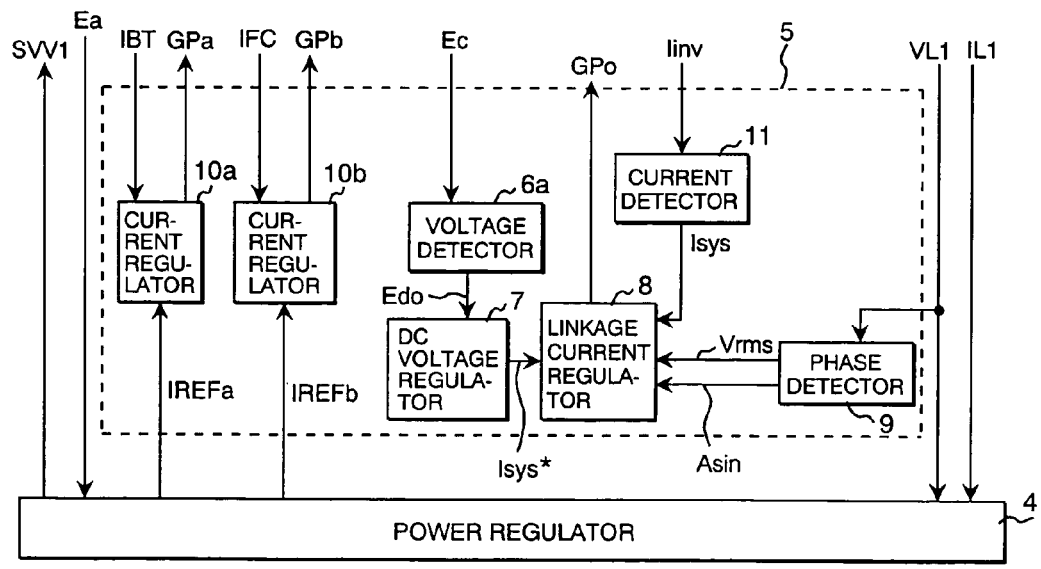
FIG. 2 is a functional block diagram of a converter controlling apparatus which is one embodiment of this invention.

FIG. 2 is a functional block diagram of a converter controlling apparatus 5 which is one embodiment of this invention.

Referring to FIG. 2 the voltage detector 6a receives said detected voltage value Ec, converts the level of the voltage value Ec to a preset voltage level Ed0, and outputs the voltage to the DC voltage regulator 7. The DC voltage regulator 7 consists of a proportion plus integration unit, calculates a current command value Isys* of the converter 1-1c so that the DC voltage command value may be equal to the detected DC voltage value Ed0 (feedback voltage value), and outputs the current command value Isys* to the linkage current regulator 8. The current detector 11 receives a current Iinv (feedback current value) from the converter CT4, converts the current into a current of a preset value Isys, and outputs it to the linkage current regulator 8. The detected current value Iinv (feedback current value) is made equal to the current command value Isys*.

The phase detector 9 calculates a phase signal Asin of amplitude "1" which follows the phase of the detected voltage value VL1 and an amplitude value Vrms of the system voltage, and outputs these to the system current regulator.

The current regulator 10b of the DC/DC converter 1-1b receives the current value IFC from the fuel cell Fc1 and a current command value IREFb from the power regulator 4 and outputs a pulse signal GPb so that the current command value IREFb may be equal to the detected current value IFC.

Similarly, the current regulator 10a of the DC/DC converter 1-1a receives a detected current value IBT from the secondary battery Bat and a current command value IREFa from the power regulator 4 and outputs a pulse signal GPa so that the current command value IREFa may be equal to the detected current value IBT.

Figure 3:
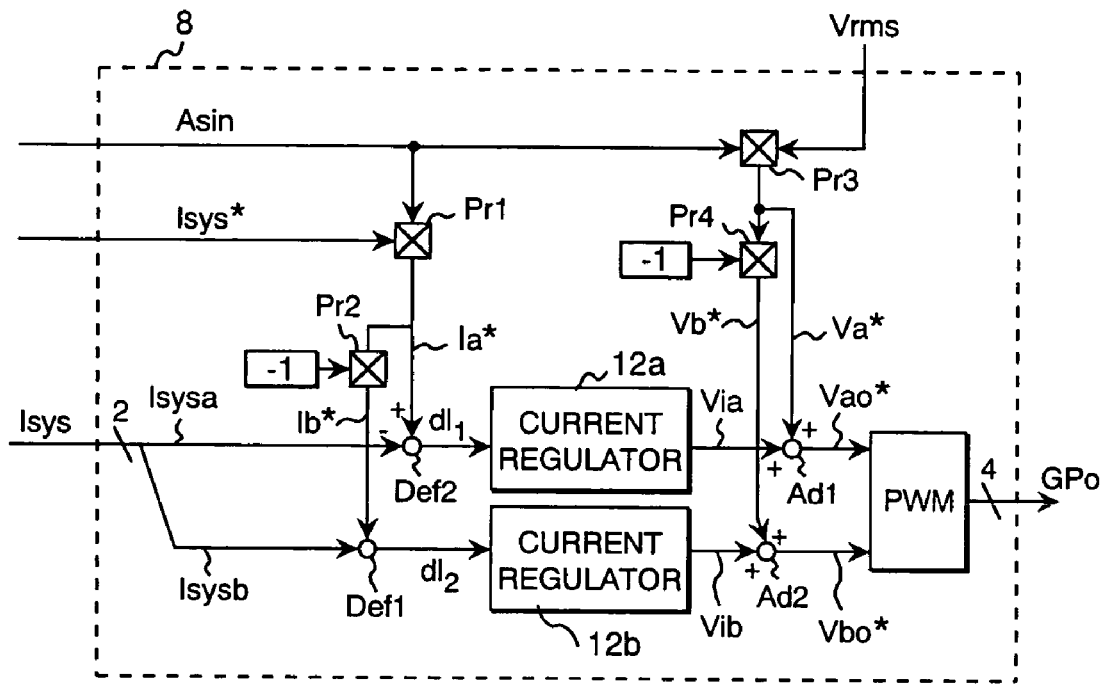
FIG. 3 is a functional block diagram of a system current regulator of this invention.

FIG. 3 shows a functional block diagram of the linkage current regulator 8.

Referring to FIG. 3, the multiplier Pr1 receives the current command value Isys* and the phase signal Asin, multiplies these, and outputs a sinusoidal current command value Ia* of an amplitude Isys*. As the phase signal Asin is regulated to a sinusoidal wave which follows the "a" phase of the system voltage, the current command value Ia* becomes a current command value of a power factor 1. The current command value Ia* is fed to the multiplier Pr2 and to the subtractor Def2. The multiplier Pr2 multiplies the input value Ia* by "−1" and outputs a current command value Ib* of the "b" phase. The subtractor Def2 receives the current command value Ia* and the phase "a" current Isysa of the detected current value, calculates their difference dI1, and outputs the result to the current regulator 12a.

Similarly, the subtractor Def1 receives the current command value Ib* and the phase "b" current Isysb of the detected current value, calculates their difference dI2, and outputs the result to the current regulator 12b.

The voltage amplitude value Vrms is a preset voltage value of the system 2 to which said converter 1-1c is connected and output as a command value to the multiplier Pr3. Said multiplier Pr3 multiplies the voltage amplitude value Vrms and the phase signal Asin and outputs a sinusoidal voltage feed-forward command value Va* of the amplitude Vrms. When the phase signal Asin is regulated to a sinusoidal wave which follows the "a" phase of the system voltage, the voltage feed-forward command value Va* becomes approximately equal to the voltage command value of the "a" phase. The voltage feed-forward command Va* is fed to the multiplier Pr4 and to the adder Ad1. The multiplier Pr4 multiplies the input value Va* by "−1" and outputs a voltage feed-forward command value Vb* of the "b" phase to the adder.

The current regulators 12a and 12b regulate the output voltage values Via and Vib to eliminate the difference of inputs (to a zero). The outputs of the current regulators 12a and 12b are respectively fed to the adders Ad1 and Ad2. The adder Ad1 adds the voltage feed-forward command Va* and the output value Via and outputs the result Vao* to the pulse width modulation calculator PWM (pulse output means). The adder Ad2 adds the voltage feed-forward command Vb* and the output value Vib and outputs the result Vbo* to the pulse width modulation calculator PWM. The pulse width modulation calculator PWM compares the input values Vao* and Vbo* by a triangular wave and outputs gate pulses $Gp_0$ for operating the single-phase inverter to the gate circuit of the converter 1-1c.

Figure 4:
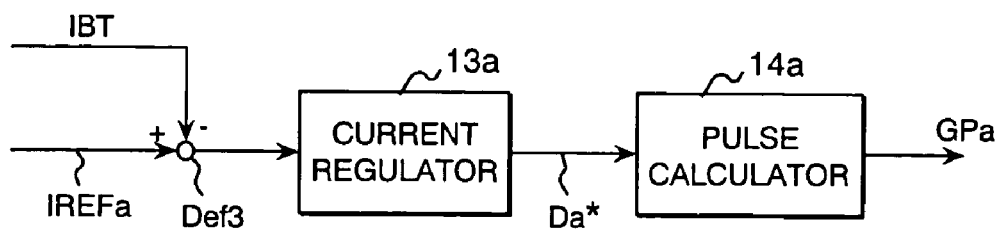
FIG. 4 is a functional block diagram of an automatic current regulator of this invention.

FIG. 4 is a functional block diagram of the current regulator 10a. Referring to FIG. 4, the subtractor Def3 receives the current command value IREFa and the detected current value IBT, calculates the difference of these inputs IREFa and IBT, and outputs the result to the current regulator 13a. The current regulator 13a regulates an output duty command value Da* to eliminate this input difference (to a zero) and outputs the value Da* to the pulse calculator 14a. The pulse calculator 14a compares the input value Da* by a triangular wave and outputs gate pulses GPa for operating the DC/DC converter 1-1a to the gate circuit of the converter 1-1a.

Figure 5:
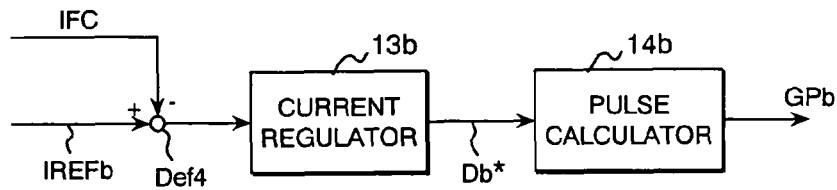
FIG. 5 is a functional block diagram of an automatic current regulator of this invention.

FIG. 5 is a functional block diagram of the current regulator 10b. Referring to FIG. 5, the subtractor Def4 receives the current command value IREFb and the detected current value IFC, calculates the difference of these inputs IREFb and IFC, and outputs the result to the current regulator 13b.

The current regulator 13b regulates their output duty command value Db* to eliminate the difference of the input values, and outputs the output value Db* to the pulse calculator 14b. The pulse calculator 14b compares the input value Db* by a triangular wave and outputs gate pulses GPb for operating the DC/DC converter 1-1b to the gate circuit of the converter 1-1b.

Figure 6:
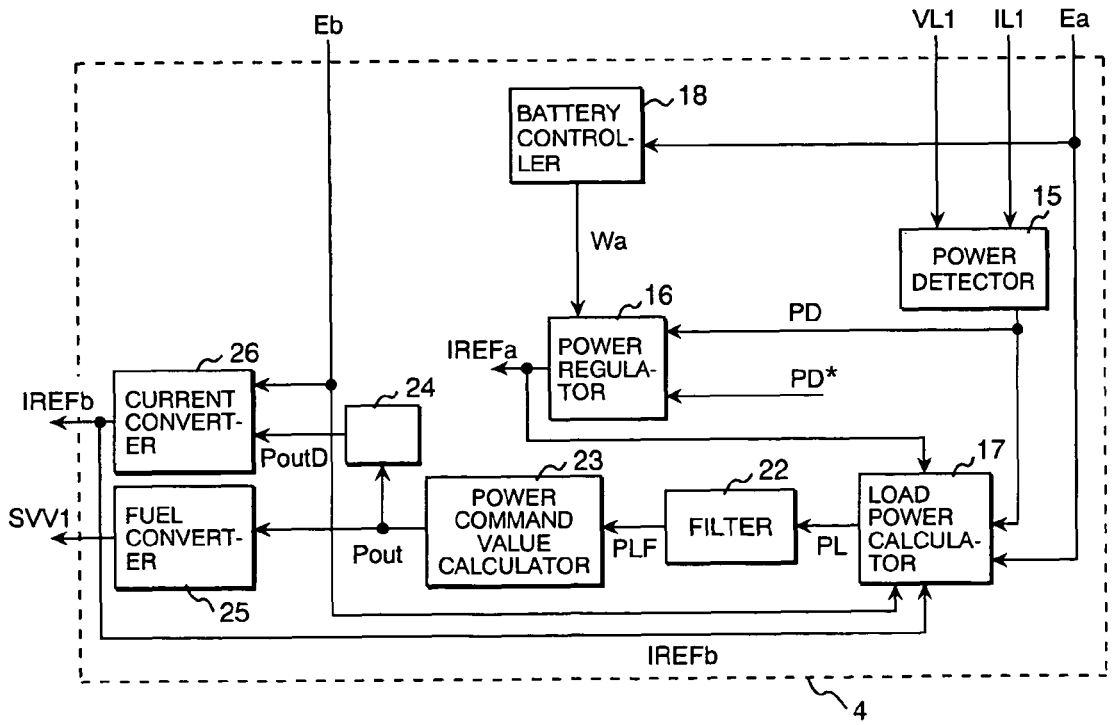
FIG. 6 is a functional block diagram of a voltage regulator of this invention.

FIGS. 6 through 10 are functional block diagrams of a power regulator 4. Referring to FIG. 6, the power detector 15 receives the system current IL1 and the system voltage VL1, calculate a power from the input values IL1 and VL1 and outputs the result (as a calculated receiving power value PD) to the power regulator 16 and the load power calculator 17. The detected secondary battery voltage value Ea is fed to the load power calculator 17 and to the battery controller 18.

The battery controller 18 has a function for calculating the remaining capacity of the secondary battery (for example, calculating the remaining capacity Wa by a Ea-Wa relationship of the secondary battery Bat) and outputs the remaining capacity value Wa to the power regulator 16. In FIG. 6, the battery controller 18 receives a voltage only, but it is possible to take in the secondary battery current and calculate the remaining capacity value Wa from the current integration value.

Figure 7:
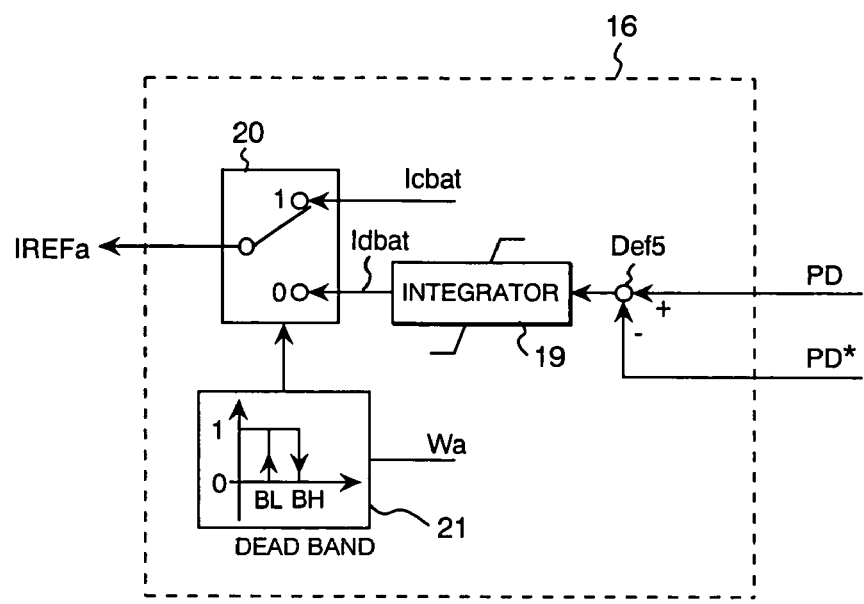
FIG. 7 is a functional block diagram of an automatic current regulator of this invention.

Referring to FIG. 7, the configuration of the power regulator 16 is explained below. The power regulator 16 receives the calculated receiving power value PD, the receiving power threshold value PD*, and the calculated remaining battery capacity Wa. The subtractor Def5 in the power regulator 16 receives the receiving power threshold value PD* and the calculated receiving power value PD, calculates the difference between these input values PD and PD*, and outputs the result to the integrator 19.

The integrator 19 integrates the differences and outputs the result (as a battery current command value Idbat) to the charge/discharge selector 20. The integrator 19 is equipped with a limiter function to prevent the integrator from overflowing. The limiter range is 0 to a value equivalent to the maximum available current of the secondary battery so that the limiter can work only when the differences are positive (only when the calculated receiving power value PD is greater than the receiving power threshold value PD*).

The charge/discharge selector discriminator 21 receives the remaining battery capacity Wa, outputs "1" so that the charge/discharge selector 20 may output a charging current command value Icbat when the remaining battery capacity Wa is below a preset capacity BH at which the secondary battery stops discharging, holds the signal "1," and outputs "0" when the remaining battery capacity Wa becomes equal to the preset capacity value BH. This hysteresis to delay output of the "0" signal enables charging.

The quantity of charging can be controlled by the preset capacity value BH. The value BH is preferably a full charging capacity in the available range of the secondary battery capacity or a little smaller than it. In this case, it is possible to quicken a charge-starting point by changing the preset BL value.

By making the preset values BH and BL changeable, the quantity of charging can be controlled according to charging requirements such as charging at night and small receiving power. The load power calculator 17 in FIG. 6 calculates a load power PL consumed by the load 3 by Equation 1 and outputs the result (a calculated load power value PL) to the filter 22.

$$PL=PD-(IREFa \times Ea+IREFb \times Eb) \quad \text{(Equation 1)}$$

The filter calculates a load power value PLF excluding a sharp change component (or high frequency components) from the load power PL and outputs it to the power command value calculator 23. The power command value calculator 23 calculates a power command value Pout which follows the change of the calculated load power value PL and outputs the power command value Pout to the delay adder 24 and to the fuel converter 25.

As above described, this invention is characterized by
a fuel cell system control unit comprising a first converter 1-1c electrically connected to an electric power system 2 through a circuit-breaker means BR1, a set of fuel cells FC1 connected to the DC circuit of said converter 1-1c through a second converter 1-1b, a secondary battery Bat connected to said DC circuit through a third converter 1-1a, a current detecting means CT4 which detects AC currents from said converters 1-1c and outputs their detected values, a voltage detecting means PT1 which detects an AC voltage on the power system side of said circuit breaker means BR1 and outputs its detected value, a fuel cell current detecting means which detects a current from said fuel cell set FC1, a fuel cell voltage detecting means which detects the voltage Eb of said fuel cell set FC1, a secondary battery current detecting means CT2 which detects a current from said secondary battery Bat, and a secondary battery voltage detecting means which detects the voltage Ea of said secondary battery Bat; wherein said fuel cell system control unit further comprises a receiving current detector IL1 which detects the total of a current flowing through said first converter 1-1c and a current flowing through an electric load 3 connected in parallel with said first converter 1-1c, a first power calculating means which calculates a receiving power from a receiving current detected by said receiving current detector IL1 and a system voltage detected by said system voltage detecting means PT1, a second power calculating means which calculates a power from said first converter, and a means which calculates a power consumed by said load 3 from the outputs of said first and second power calculating means.

Figure 8:
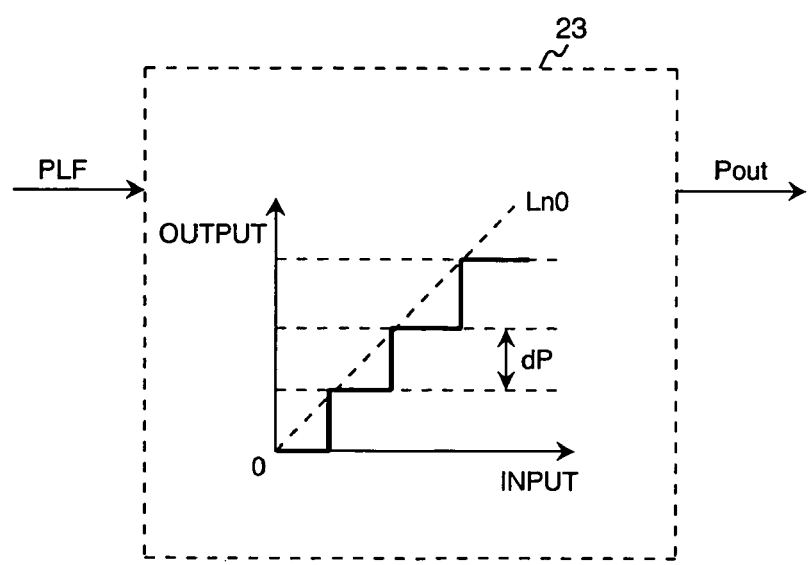
FIG. 8 is a functional block diagram of a power command value calculator which is one embodiment of this invention.

FIG. 8 is a functional block diagram of a power command value calculator 23. The power which the fuel cell FC1 can output varies depending upon the quantity of fuel (modified gas) supplied to the fuel cell. For example, when the valve VV1 for controlling the fuel is regulated stepwise, the power which is output by the fuel cell FC1 also varies stepwise. (The width of the power change step is defined as "dP.") When the valve VV1 is regulated finely, the power which is output by the fuel cell FC1 varies finely. This stepwise regulation is explained in detail by way of an example. As shown in FIG. 8, the power command value calculator 23 varies the power command value Pout stepwise so that the power command value Pout may not go over the line Ln0 whose gradient (the ratio of output to input) is 1. In this case, the step height is determined by the output change width dP. When the difference between the input value and the line Ln0 becomes greater than the change width dP, the power command value Pout is incremented by the change width dP. The maximum power command value Pout is limited in advance so that the fuel output capacity may be a maximum Pmax.

Figure 9:
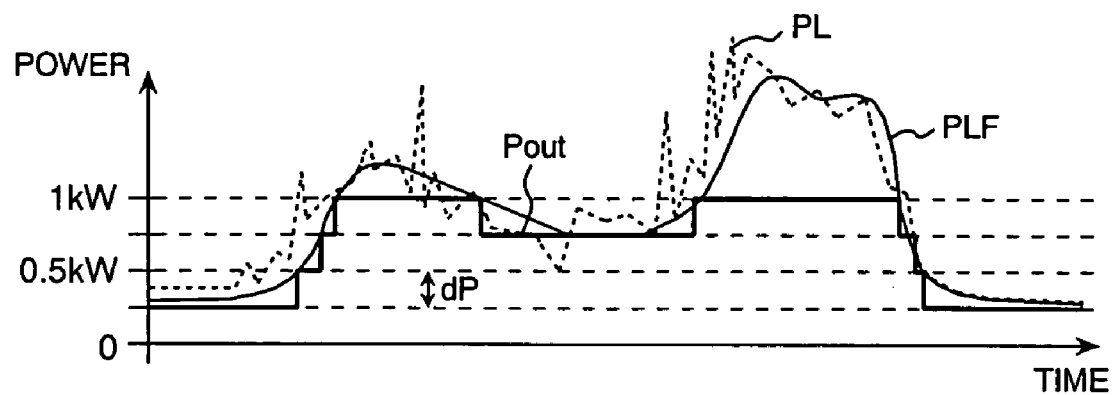
FIG. 9 is an explanatory figure for operation of the power command value calculator which is one embodiment of this invention.

FIG. 9 shows behaviors of the calculated power value PLF and the power command value Pout. The power command value Pout of the fuel cell follows the calculated power value PLF as the load power PL changes.

The fuel converter 25 of FIG. 6 calculates the opening command SVV1 for the fuel regulating valve VV1 equivalent to the power command value Pout and varies the opening of the fuel regulating valve VV1. With this, a flow rate of fuel equivalent to the power command value Pout is supplied to the fuel cell. Actually, however, the electric output cannot be increased immediately when the fuel flow rate is changed because of a delay of fuel flowing through the pipe, a delay in production of modified gas from fuel, and so on. To solve this problem, the delay adder 24 adds a delay time equivalent to the above delays (fuel supply delay in the pipe and delay in hydrogen-rich gas production) to the power command value Pout and outputs a power command value PoutD including a delay time to the current converter 26.

The current converter 26 receives the power command value PoutD and the fuel cell voltage Eb, divides the PoutD value by the Eb value to get a current command value IREFb of the fuel cell.

Figure 10:
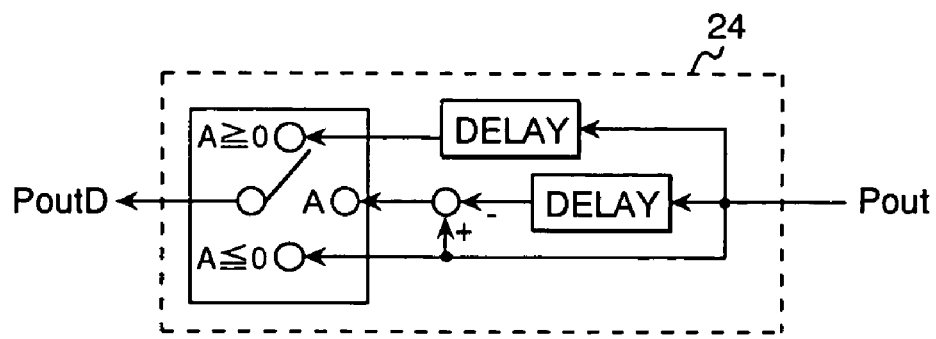
FIG. 10 is a functional block diagram of a delay adder of this invention.

Referring to FIG. 10, the configuration of the delay adder 24 is explained below.

The delay adder 24 is so designed that the delay element "delay" delays the change of the power command value Pout by a preset time period (equivalent to a delay time between the increase of fuel and power generation) when the command value Pout increases or adds no delay time when the command value Pout decreases. (Although this example does not add a delay time, it is possible to add a delay time. In this case, the power output from the fuel cell is apt to exceed the load power and the charging time of the secondary battery increases.)

Figure 11:
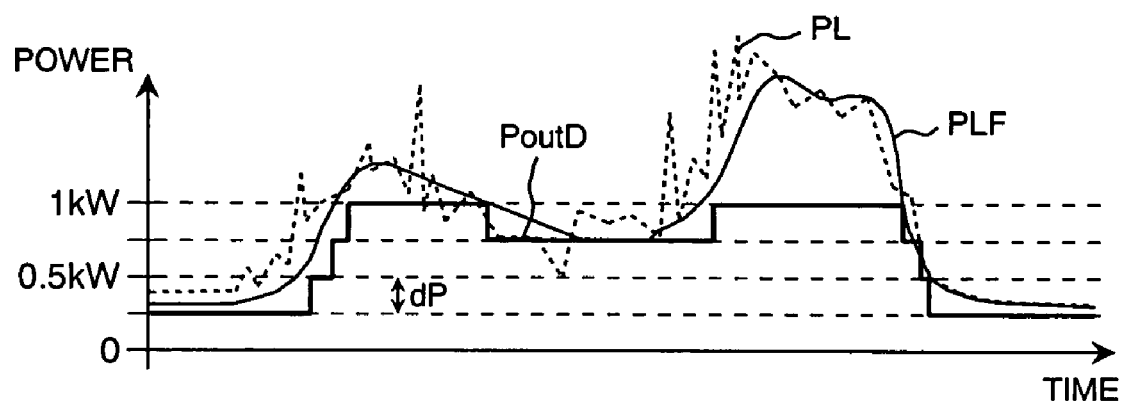
FIG. 11 is an explanatory figure for operation of the fuel cell system control unit which is one embodiment of this invention.

Referring to FIG. 11, the operation of the power converter is explained below.

The operation of the load power PL, the calculated power value PLF, and the power command value PoutD (signal adding a rise delay time to the power command value Pout) is omitted here. (See the description of FIG. 9.) When the receiving power threshold value PD* is set to for example 0 kW, the secondary battery supplies the difference between PL and Pout. When PL is greater than Pout, the secondary battery discharges the difference to keep the receiving power at 0 kW. Contrarily, when PL is smaller than Pout, the secondary battery charges the difference (charged from the fuel cell) to keep the receiving power at 0 kW.

As above described, this invention is characterized by
a fuel cell system control unit comprising a first converter 1-1c electrically connected to an electric power system 2 through a circuit-breaker means BR1, a set of fuel cells FC1 connected to the DC circuit of said converter 1-1c through a second converter 1-1b, a secondary battery Bat connected to said DC circuit through a third converter 1-1a, a current detecting means CT4 which detects AC currents from said converters 1-1c and outputs their detected values, a voltage detecting means PT1 which detects an AC voltage on the power system side of said circuit breaker means BR1 and outputs its detected value, a fuel cell current detecting means which detects a current from said fuel cell set FC1, a fuel cell voltage detecting means which detects the voltage Eb of said fuel cell set FC1, a secondary battery current detecting means CT2 which detects a current from said secondary battery Bat, and a secondary battery voltage detecting means which detects the voltage Ea of said secondary battery Bat; wherein the fuel cell system control unit further comprises a voltage regulating means 7 (voltage controller) which feeds back a DC voltage value Ed0 detected by said first converter 1-1c and outputs a current command value Isys* so that the product of the fed-back DC voltage value by the current command value may be equal to the power command value, automatic current regulators 12a and 12b (current regulators) which respectively feed back said detected current value Iinv and outputs voltage command values Vao* and Vbo* to make the current equal to said current command value Isys*, a pulse output means (Pulse width modulation calculator) which receives said output voltage command value and outputs pulses GP0 to drive the converter 1-1c, and a control unit which controls charging and discharging of the power system and power according to said voltage command value Isys*.

The fuel cell system control unit further comprises power converters 1-1a, 1-1b, and 1-1c wherein a means for controlling said second converter 1-1b has a current control means 13b (current controller) to make the current command value IREFb equal to the current IFC of the fuel cell and a means for controlling said third converter 1-1a has a current control means 13a to make the current command value IREF equal to the current IBT of the secondary battery.

The fuel cell control system further comprises
a receiving current detector CT1 which detects the total of
a current flowing through said first converter 1-1c and a
current flowing through an electric load 3 connected in parallel with said first converter 1-1c,
a first power calculating means 15 (power controller) which calculates a receiving power from a receiving current IL1 detected by said receiving current detector CT1 and a system voltage VL1 detected by said system voltage detecting means PT1,
a second power calculating means 17 (converter controller) which calculates a power from said first converter 1-1c, and
a means 4 which calculates a power consumed by said load 3 from the outputs of said first and second power calculating means 15 and 17.

The fuel cell system control unit of this invention detects a receiving power by this configuration and cuts its peaks by the secondary battery.

The fuel cell system control unit calculates a load power from a detected receiving power and command values of the secondary battery and the power generating apparatus in the controller.

The fuel cell system control unit uses the load power for creation of fuel cell command values.

In this configuration, the output of the power generating apparatus is made to follow the low-frequency component in the fluctuation of the load power.

A time delay before power generation of the fuel cell due to a fuel delay in the pipe, etc. is added when a current command value goes up as the fuel increases.

The current control command value is limited to take out current from the fuel cell.

This invention can detect a receiving power and cuts its peaks by the secondary battery according to it. This can prevent the receiving power from going over the permissible receiving power value due to the delay of output of the power generating apparatus.

This invention can calculate a load power from a detected receiving power and command values of the secondary battery and the power generating apparatus in the controller. This can omit current and voltage sensors for the load power.

This invention can use the load power for creation of fuel cell command values. This can separate a power from the secondary battery and make the fuel cell follow the load power.

Further, this invention can make the output of the power generating apparatus follow the low-frequency component in the fluctuation of the load power. This can downsize the secondary battery as a long great power from the secondary battery is not required. Furthermore, this invention can prevent a frequent fuel supply change due to a load fluctuation. With this, the fuel cell can use the fuel effectively for power generation and make the whole system high efficient.

Still further, this invention adds a time delay before power generation of the fuel cell due to a fuel delay in the pipe, etc. is added when a current command value goes up as the fuel increases. This can make the fuel cell output power after the fuel is supplied to the fuel cell and prevent deterioration of the electrodes.

Finally, this invention limits the current control command value to take out current from the fuel cell. This can prevent overloading of the fuel cell.

What is claimed is:

1. A fuel cell system control unit comprising:
   a first power converter electrically connected to an electric power system;
   an electric load connected to an electric line which ties the electric power system and the first power converter;
   a set of fuel cells connected to a DC circuit of said first power converter through a second power converter;
   a secondary battery connected to said DC circuit through a third power converter;
   a system voltage detecting means which detects an AC voltage on the power system and outputs its detected value;
   a receiving current detector for detecting the receiving current which is total of a current flowing through said first power converter and a current flowing through the electric load;
   means for calculating a receiving electric power based on the receiving current detected by said receiving current detector and the system voltage detected by said system voltage detecting means;
   means for controlling said third power converter so that said receiving power does not exceed a receiving power threshold value;
   means for calculating the output power of the secondary battery;
   means for calculating the output power of the set of fuel cells;
   means for calculating the load power which the load consumes based on the receiving power, the output power of the secondary battery, and the output power of the set of fuel cells;
   means for calculating an average value of the load power by filtering the load power calculated;
   means for controlling the second power converter so that the output power of the set of fuel cells approaches the average value of load power; and
   means for controlling the first electric power converter so that a DC side voltage of the first electric power converter approaches a predetermined DC voltage instruction value.

2. The fuel cell system control unit of claim 1, further comprising:
   a voltage regulating means which feeds back a DC voltage value detected by said first converter and outputs a current command value so that the product of the fed-back DC voltage value by the current command value may be equal to a power command value;
   an automatic current regulator which feeds back said detected AC current value and outputs an output voltage command value to make the current equal to said current command value;
   a pulse width modulation (PWM) means which receives said output voltage command value and outputs pulses to drive the converter; and
   a control unit which controls charging and discharging of the power system and power according to said voltage command value.

3. The fuel cell control system according to claim 1, wherein said means for controlling said first-third converters further comprises:
   a first current control means to make the current command value equal to the current of the fuel cell; and
   a second current control means to make the current command value equal to the current of the secondary battery.

4. The fuel cell control system according to claim 1, wherein said control means comprises a means for calculating average values from said detected load power values.

* * * * *